United States Patent [19]

Curiel

[11] Patent Number: 4,567,918
[45] Date of Patent: Feb. 4, 1986

[54] LIQUID RESERVOIR AND METHOD OF DISPENSING A LIQUID THEREFROM BY MEANS OF A VEHICLE

[75] Inventor: Yoram Curiel, Aurora, Colo.

[73] Assignee: Flexcel International, Inc., Lakewood, Colo.

[21] Appl. No.: 695,388

[22] Filed: Jan. 28, 1985

Related U.S. Application Data

[63] Continuation-in-part of Ser. No. 480,934, Mar. 31, 1983, abandoned, which is a continuation-in-part of Ser. No. 445,458, Nov. 30, 1982, abandoned.

[51] Int. Cl.⁴ .............................................. B65B 3/04
[52] U.S. Cl. ........................................ 141/1; 150/55; 222/1; 222/92; 141/250; 244/135 R
[58] Field of Search .................. 141/1, 5, 114, 392, 141/389, 114; 222/1, 92, 107; 150/55; 169/30, 62, 73; 280/4; 244/135 R, 135 B

[56] References Cited

U.S. PATENT DOCUMENTS

| | | | |
|---|---|---|---|
| 183,690 | 10/1876 | Loomis | 222/3 |
| 637,242 | 11/1899 | Ehrman | 417/149 |
| 1,660,713 | 2/1928 | Kauch et al. | 169/73 |
| 2,401,950 | 6/1946 | McMahan | 152/14 |
| 2,430,905 | 11/1947 | Bradley | 150/55 |
| 2,519,393 | 8/1950 | Noyes | 244/135 |
| 2,719,628 | 10/1955 | Ivanoff | 206/47 |
| 2,724,418 | 11/1955 | Krupp | 150/55 |
| 2,784,755 | 3/1957 | Bender | 150/55 |
| 2,795,245 | 6/1957 | Meehan | 141/26 |
| 3,082,286 | 3/1963 | Schuster | 136/162 |
| 3,133,566 | 5/1964 | Hoss | 141/350 |
| 3,169,581 | 2/1965 | Cummins | 169/24 |
| 3,260,412 | 7/1966 | Larkin | 222/107 |
| 3,282,361 | 11/1966 | Mackie | 180/7 |
| 3,334,676 | 8/1967 | Girard | 150/55 |
| 3,416,762 | 12/1968 | Headrick | 248/361 |
| 3,606,090 | 9/1971 | Byers | 222/102 |
| 3,760,431 | 9/1973 | Schwibner | 4/156 |
| 3,788,369 | 1/1974 | Killiager | 141/114 |
| 4,009,622 | 3/1977 | Hinderks | 74/492 |
| 4,322,019 | 3/1982 | Smith | 222/83.5 |

FOREIGN PATENT DOCUMENTS 911267 7/1946 France .
7814109 11/1980 France .

*Primary Examiner*—Stephen Marcus
*Assistant Examiner*—Ernest G. Cusick
*Attorney, Agent, or Firm*—Arnold B. Silverman

[57] ABSTRACT

A method of dispensing a liquid including providing a liquid containing resilient storage reservoir, positioning the reservoir in the path of traction means of the vehicle and moving the vehicle so as to cause the traction means to run over at least a portion of the resilient liquid storage reservoir in a longitudinal axial direction to thereby urge liquid out of the reservoir while resisting substantial lateral expansion of said reservoir in front of said traction means. The method and reservoir may be employed to refuel a vehicle by connecting the reservoir with a fuel inlet of the vehicle. The reservoir is preferably composed of a resiliently deformable material. It is preferably elongated and has tapered end. The reservoir may advantageously have tread means on the upper surface and/or lower surfaces.

27 Claims, 13 Drawing Figures

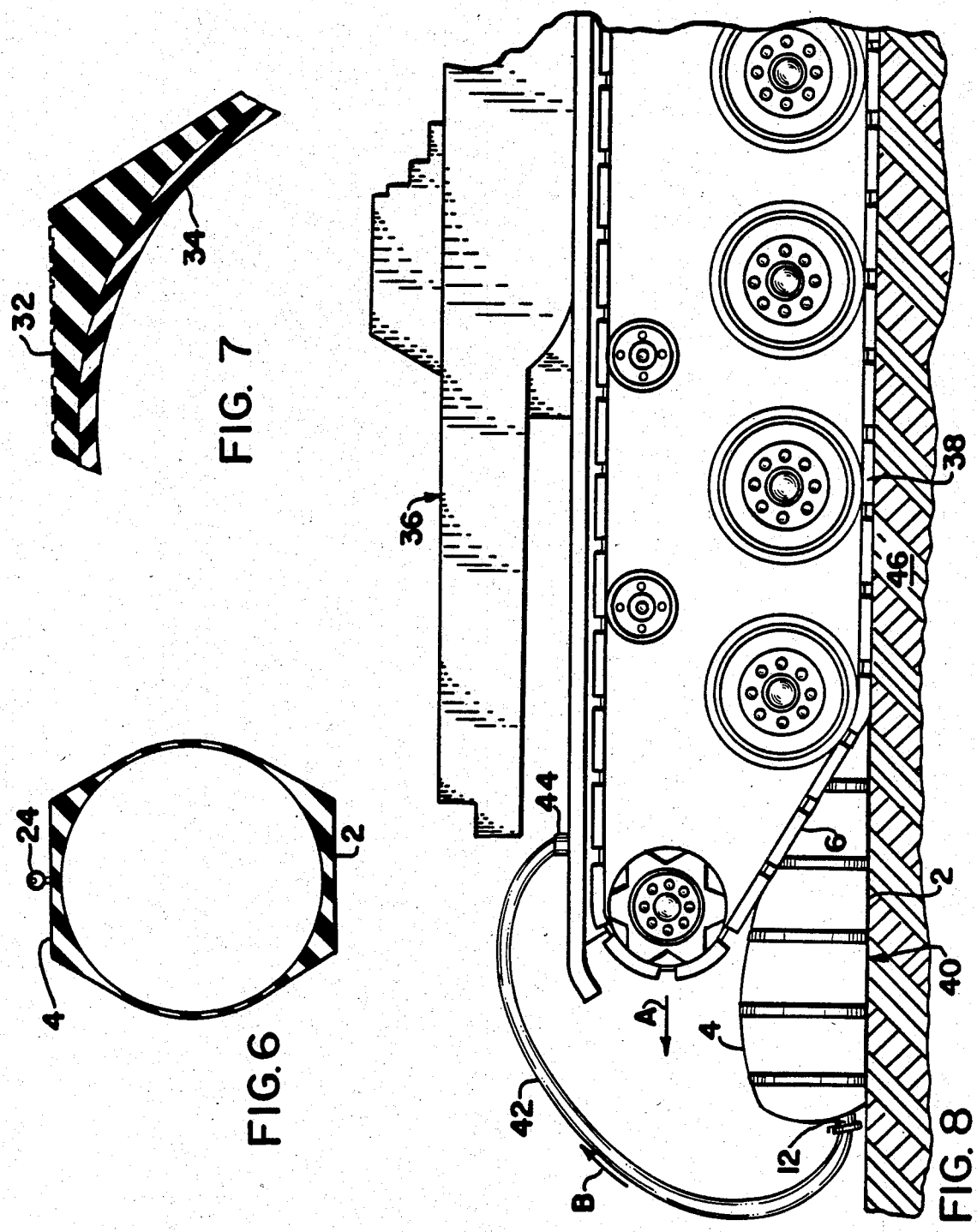

LIQUID RESERVOIR AND METHOD OF DISPENSING A LIQUID THEREFROM BY MEANS OF A VEHICLE

This application is a continuation-in-part of U.S. Ser. No. 480,934 filed Mar. 31, 1983, now abandoned and entitled LIQUID RESERVOIR AND METHOD OF DISPENSING LIQUID THEREFROM BY MEANS OF A VEHICLE which in turn was a continuation-in-part of U.S. Ser. No. 445,458 filed Nov. 30, 1982, now abandoned and entitled FUEL RESERVOIR AND METHOD OF REFUELING A VEHICLE.

BACKGROUND OF THE INVENTION

1. Field of the Invention

This invention relates to a method of dispensing a liquid by means of a vehicle and, more specifically, it relates to such a method which involves a uniquely designed, resiliently compressible reservoir which is adapted to be compressed between the ground and the vehicle traction means so as to express the liquid from the reservoir.

2. Description of the Prior Art

Systems for remote delivery of liquids, such as fuel, water for drinking, bathing, cooking or other purposes, agricultural irrigation liquids and fire extinguishing materials have been known. One common approach has been to employ tanker trucks having a rigid or flexible reservoir of the liquid and an associated power driven pump to dispense the same.

With respect to most needs for refueling vehicles, it has generally been known to position the vehicle adjacent to a stationary, permanently installed fuel reservoir and to employ a power energized (as by electrical motor or internal combustion engine) pump to transfer the fuel from the reservoir to the vehicle's fuel tank.

It has also been known to move such storage reservoirs on vehicles in order that the vehicles carrying the fuel may be moved to the vehicles to receive fuel and to employ power energized pumps to effect the transfer.

In many situations, it is inefficient and, sometimes, dangerous to rely on such known approaches. One such situation occurs in respect of the need to supply water or to refuel military vehicles, such as tanks, for example, in combat zones. The need to rely on mobile tanker trucks not only substantially increases the amount of time involved, but also in respect of refueling only one or two military vehicles can receive fuel from such a truck at one time. The need to refuel such vehicles sequentially increases the risks of loss of life and equipment. A further problem is the uncertainty of being able to drive such a tanker truck to the combat zone. Also, a grouping of such vehicles creates an easy target for the enemy.

It has also been known to use the so-called bladder collapsible storage containers to deliver fuel which is to be transferred by means of a power energized pump. One of the advantages of this approach over the tanker trucks is the ability to put the container to other uses and the fact that a single vehicle can return a large number of empty bladders to a refueling center.

It has also been known to employ the "fuel cell" which by means of a portable power pump and skilled personnel can be used to deliver fuel to military vehicles. One of the advantages of such fuel cells is that they are small enough to be delivered by helicopter and dropped to the desired location. It also requires a power pump and special packaging.

A further problem with approaches requiring a power pump is that the pump may break down at a critical time.

Yet another problem exists in connection with the need to refuel or provide a supply of water or other liquids at sites of major disasters, such as earthquakes, floods and severe storms, for example. In such circumstances electricity with which to operate pumps may be unavailable and access roads may be blocked or severely damaged.

In spite of the previously known systems for refueling vehicles at remote locations, such as in a military combat zone, for example, and other systems for remote delivery of liquids there remains the need for an improved method and associated reservoir.

SUMMARY OF THE INVENTION

The present invention has solved the above-described problems by providing a method of dispensing liquids in remote locations without requiring dependence on power driven pump or tanker trucks.

The method of the present invention includes providing a liquid containing, elongated resilient storage reservoir having an outlet opening, positioning the reservoir in a path of traction means of vehicle and moving the vehicle so that the traction means progressively compresses the resilient storage reservoir along its logitudinal axis so as to express liquid from the reservoir while resisting substantial lateral expansion of said reservoir in front of the traction means. The reservoir preferably has a ground engaging surface, and a tapered portion at one end to facilitate engagement by the vehicle traction means. In one embodiment, the exterior of the reservoir body has a generally cylindrical exterior configuration with a tapered portion being of generally conical shape. In another embodiment, the lower surface may be substantially flat, the upper surface may have a portion which is substantially flat and generally parallel to the lower surface and have an adjacent top portion which is substantially flat which extends angularly downwardly. In the case of refueling, the reservoir outlet is connected to the fuel inlet. The reservoir is such as to resist substantial lateral expansion in front of the traction means.

In general, it is preferable to place the outlet means at the opposite end of an elongated reservoir with respect to the tapered portion which is disposed at or adjacent the other end. Tread means may be provided on the upper surface to facilitate the frictional engagement of the traction means with the upper surface. Tread means may also be provided on the ground engaging portions.

Externally provided reservoir engaging means may be secured to the exterior of the reservoir to facilitate handling of the same.

It is an object of the present invention to provide an improved efficient means of delivering liquids by means of a vehicle.

It is an object of the present invention to provide an efficient and rapid method of refueling vehicles at a remote location.

It is a further object of the present invention to provide such methods wherein the use of tanker trucks, power operated pump means and skilled personnel are not required.

It is a further object of the present invention to provide resiliently compressible fuel reservoirs which are adapted to receive, store and deliver fuel to the vehicle's fuel tank through movement of the vehicle.

It is a further object of the invention to permit simultaneous refueling of a number of vehicles by using a number of reservoirs to not only minimize the risks of refueling, but to render the vehicles ready for use more rapidly.

It is a further object of the present invention to provide such reservoirs which resist undesired lateral expansion and are readily reusable.

These and other objects of the invention will be more fully understood from the following description of the invention on reference to the illustrations appended hereto.

BRIEF DESCRIPTIONS OF THE DRAWINGS

FIG. 6 is a cross-sectional illustration of the liquid storage reservoir of FIG. 1 taken through 6—6 of FIG. 1.

FIG. 7 is a fragmentary cross-sectional view of a portion of the wall of a liquid storage reservoir of this invention.

FIG. 8 illustrates a vehicle in the process of refueling using a fuel storage reservoir of the present invention.

DESCRIPTION OF THE PREFERRED EMBODIMENTS

As used herein the term "traction means" refers to a vehicle's ground engaging means which permits it to move along the ground and shall expressly include, but not be limited to, wheels, tires, endless tread belts and other such members.

As used herein the term "ground" shall be intended to refer broadly to the surface supporting a vehicle be it earth, gravel, paved roads or any other surface on which liquid delivery is to be achieved.

As used herein "fire extinguishing material" shall refer to a liquid, slurry or foam, with or without flame retarding additives and shall expressly include water.

While for clarity of description specific reference will be made to use of the invention in connection with a preferred use in dispensing of fuels, other uses including but not limited to use in connection with drinking, bathing water, plant irrigation and fire extinguishing material, for example, will be equally advantageous.

Figure 1:
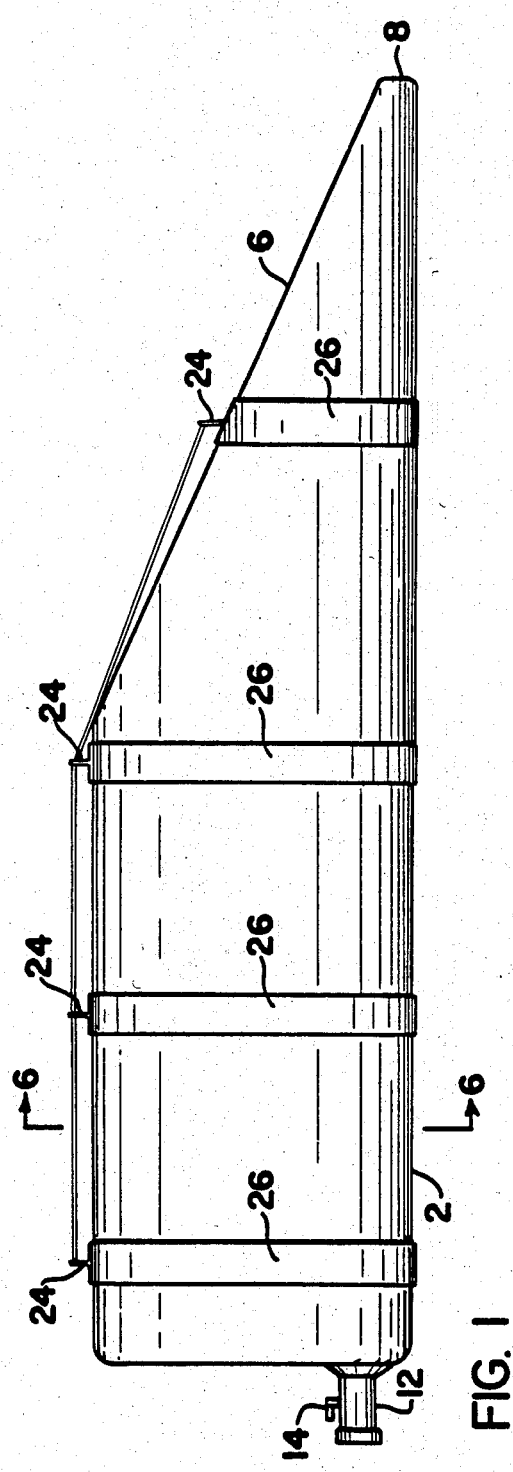
FIG. 1 is a front elevational view of a form of a liquid storage reservoir of the present invention.
Figure 3:
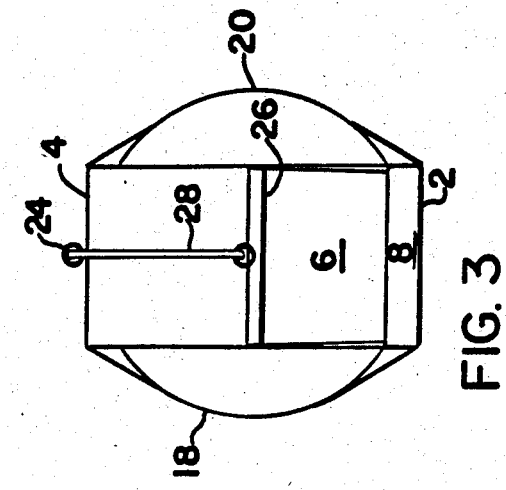
FIG. 3 is a left side elevational view of the liquid storage reservoir of FIG. 1.
Figure 2:
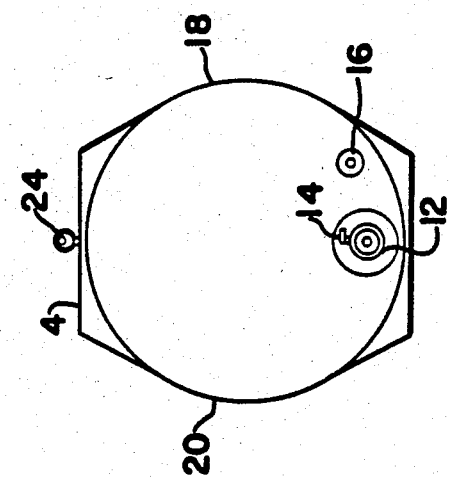
FIG. 2 is a right side elevational view of the liquid storage reservoir of FIG. 1.

Referring more specifically to the embodiment shown in FIGS. 1 and 3, the reservoir member has an elongated body. The reservoir has a substantially flat ground engaging surface 2, an upper wall portion 4 which is substantially flat and oriented generally parallel with respect to the ground engaging surface 2 and an adjacent upper wall surface 6 which is oriented generally angularly downwardly toward end wall 8. The side walls 18, 20, in the form shown, bulge outwardly and are generally circular in section. At the end opposite end wall 8 is an end wall 10 to which is secured an outlet 12 within which is the valve operated by valve control element 14. This may advantageously be manually rotatable to open and close the valve. A pressure relief member 16 which may consist of a plug which is adapted to pop out if pressure inside the reservoir reaches too high a level is provided. At safe pressures, member 16 resists the flow of fluid therethrough. When filling the reservoir so as to permit any air contained within the reservoir to be exhausted and replaced by fuel, such as gasoline or diesel fuel, or other liquid, for example, suitable venting is provided. This may be accomplished readily by a vented connection in the outlet 12 or a separate opening in the reservoir, for example.

In order to facilitate ease of handling, it is desirable to provide external means which may be gripped manually or by suitable lifting equipment, such as a crane, fork lift or hoist. In the embodiment shown a series of strap members 26 are secured circumferentially about the reservoir exterior and have a series of loop members 24 projecting upwardly therefrom. A suitable wire or other member is secured to the end loops 24 and adapted to be engaged in lifting the reservoir.

Figure 4:
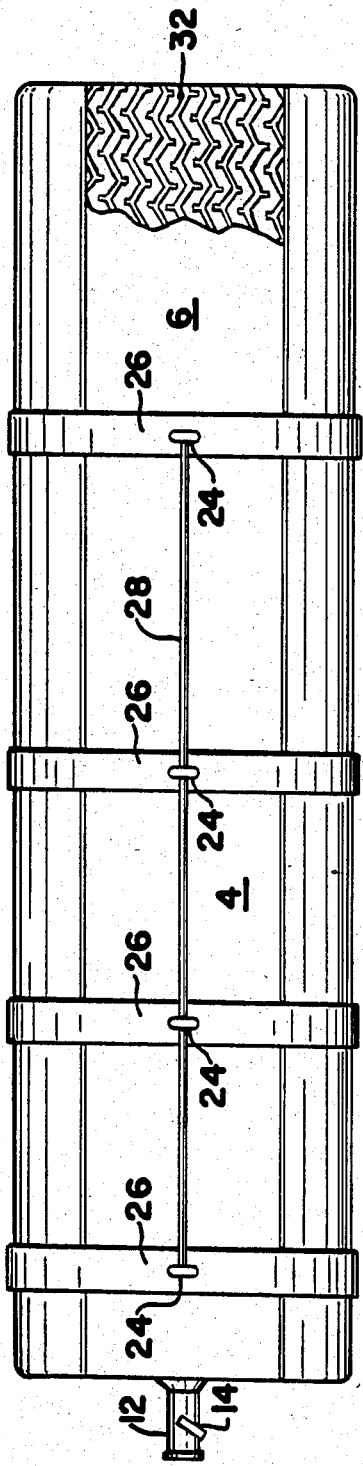
FIG. 4 is a top plan view of the liquid storage reservoir of FIG. 1.
Figure 5:
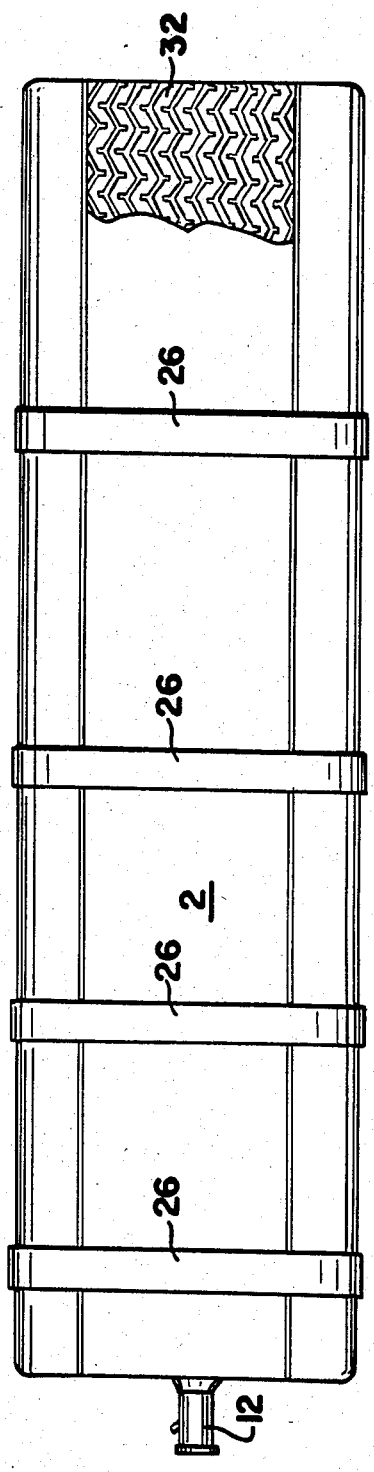
FIG. 5 is a bottom plan view of the liquid storage reservoir of FIG. 1.

FIGS. 4 and 5 show, respectively, top plan and bottom plan views of the compressible reservoir of FIGS. 1 through 7.

Referring now to FIGS. 6 and 7, a preferred construction of the reservoir will now be considered. It is generally desirable to have the reservoir composed of a resiliently compressible material such as neoprene rubber, for example. The inner lining material should be one which is inert with respect to the liquid to be contained within the reservoir. In the form shown, a rubber bladder 34 is provided as the interior lining. External tread 32 is provided on the upper surfaces in order to maximize traction efficiency between the vehicle traction means and the reservoir. If desired, reinforcement may be provided within the walls of the reservoir as by use of metal fibers or synthetic fibers, for example. Also, if desired, a tread 32, may be provided on ground engaging surface 2 in order to improve the frictional resistance to undesired movement of the reservoir along the ground. The reservoir should be compressible under the influence of longitudinal axial movement of the traction means so as to permit progressive discharge of the liquid while resisting substantial lateral expansion of the reservoir in front (the direction from the traction means to the discharge end of the reservoir) of the traction means.

By way of example, and not limitation, the reservoir of the present invention may advantageously have a diameter of approximately 2.5 feet measured across the sidewalls and a length of about 8 to 10 feet. It preferably will hold about 10 to 200 gallons of liquid. For sizes under about 25 gallons a generally cylindrical reservoir may be preferred.

Referring now to FIG. 8, there is shown a vehicle in the form of a military tank 36 which is disposed with its traction means 38 in the form of an endless tread member in contacting overlying relationship with the tapered portion defined by the downwardly angularly sloping portion 6 of upper wall and a portion of the ground engaging surface 2. A filler tube 42, which may advantageously be about 2 to 3 inches in diameter, has one end secured to reservoir outlet 12 and the other end secured to fuel inlet 44 of the tank. As the tank advances toward the left of FIG. 8 as indicated by arrow A, it will move onto the upper surface 4, 6 of the reservoir thereby applying a compressive force between the tank tread member 38 and the ground 46 to thereby initiate flow of fuel in tube 42 in direction indicated by arrow B. The rate of advance of the tank is preferably such as to create a desired rate of flow. When transfer of fuel has been completed, the tube 22 is removed from the fuel inlet 44, disconnected from outlet means 12 and the outlet 12 may be provided with a closure (not shown) such as a threaded closure to close the outlet 12 and permit the reservoir to be returned to a filling station. As substantial lateral expansion of the reservoir between the traction means and outlet 12 is resisted, efficient discharge of the fluid is effected.

Figure 9:
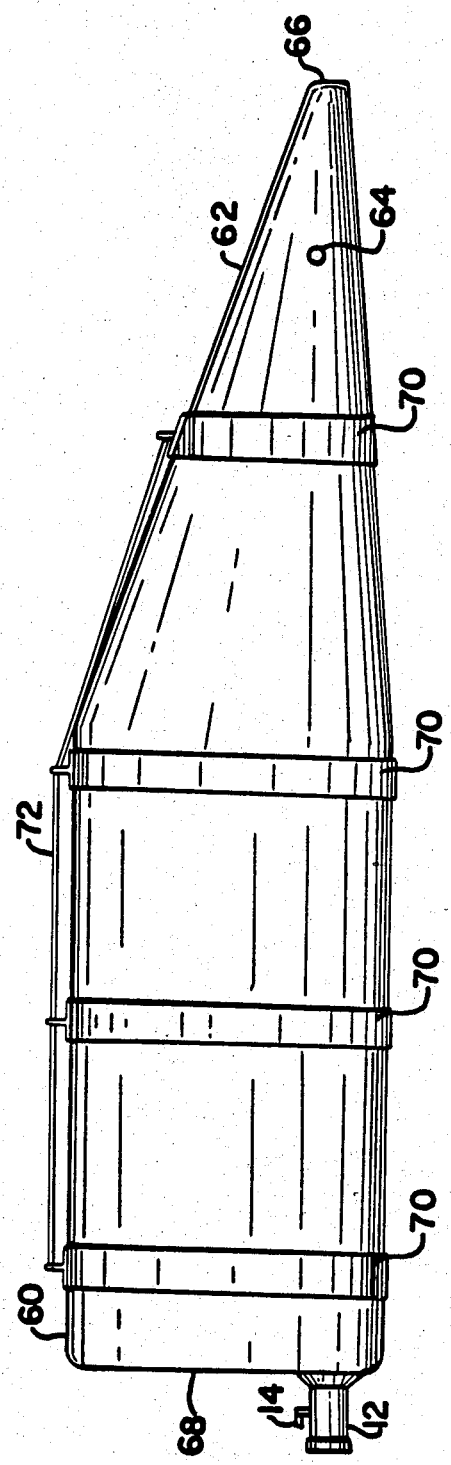
FIG. 9 is a front elevational view of another embodiment of the invention.
Figure 11:
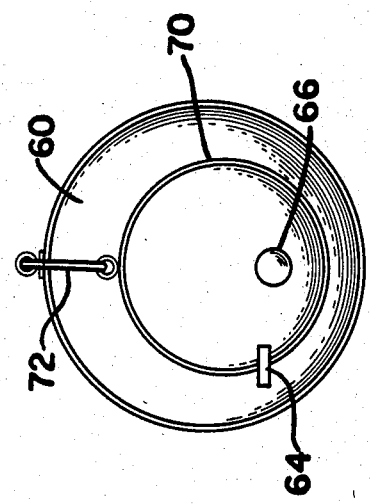
FIG. 11 is a left side elevational view of the reservoir of FIG. 9.
Figure 10:
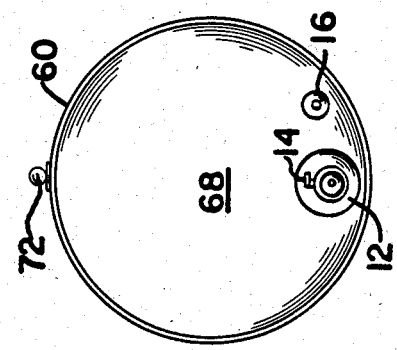
FIG. 10 is a right side elevational view of the reservoir of FIG. 9.

Referring to FIGS. 9 through 11, there is shown a modified form of reservoir. This embodiment has an elongated body provided with a generally cylindrical exterior shape 60 with an adjacent conical portion 62. The conical portion 62 provides a tapered section to facilitate engagement with traction means. Straps 70 secure line 72 to the reservoir through a series of loop members. Circular end walls 66, 68 are provided. An advantage of this embodiment is that it may be moved easily by rolling it along the ground or off of a vehicle about the reservoir's longitudinal axis. Another feature, which may be used in other embodiments as well, is inlet valve 64 which may be connected to a source of compressed air, such as a pressurized container, for example, to assist with discharge of liquid in the event the vehicle was unable to move. Treads, such as 32 may be provided for improved traction.

Figure 12:
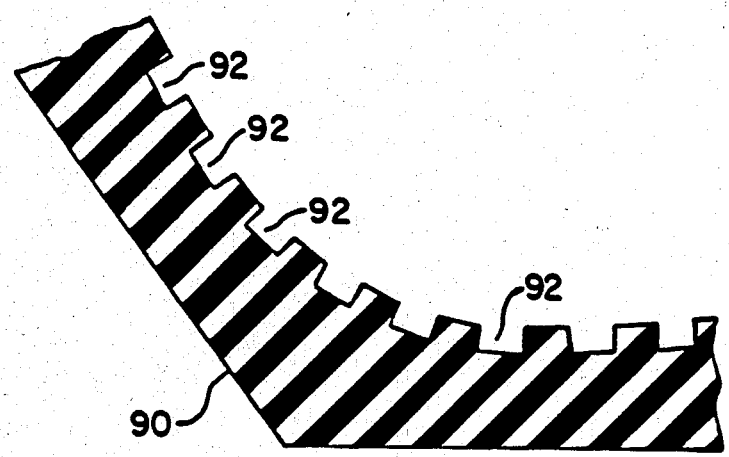
FIG. 12 is a fragmentary cross-sectional illustration of a portion of a modified reservoir wall.
Figure 13:
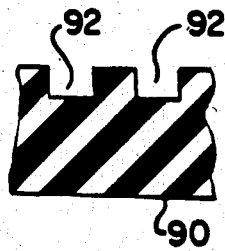
FIG. 13 is a fragmentary portion of the reservoir wall of FIG. 12.

Referring now to FIGS. 12 and 13 another feature of the invention will be considered. In some instances undesired small quantities of water may be mixed with fuel either prior to introduction into the reservoir or through condensation within the reservoir. If desired, a filter which permits passage of fuel but not water therethrough may be provided in the outlet region. Alternatively or in addition thereto the features of FIGS. 12 and 13 may be employed. The reservoir wall 90 may be provided with a plurality of inwardly open recesses 92. As water is heavier than fuel, the water will tend to accumulate within the recesses 92 and, therefore, be less likely to be urged out of the reservoir during pumping action. In the form illustrated, the recesses 92 are preferably substantially longitudinally oriented with respect to the reservoir and extend over a major portion of the length of the reservoir. In the embodiments of FIGS. 1–8 they may be placed in the lower wall portions and in the embodiments of FIGS. 9–11 about the circumference.

The preferred embodiment of the reservoir is such that dropping a filled reservoir from an aircraft will result in the major portion of the impact shock created upon hitting the ground being absorbed by the reservoir tumbling along the ground as distinguished from flexing of the sidewalls.

It will be appreciated while the present invention has been illustrated in its preferred forms having either a generally flat lower surface, a generally flat upper surface parallel to the lower surface and an angularly downwardly directed surface to facilitate engagement with the vehicle traction means or a cylindrical surface cooperating with a conical surface, other configurations for the reservoir will be apparent to those skilled in the art.

The present invention has, therefore, provided a simple and efficient method of rapidly dispensing liquid as in refueling military or non-military vehicles in a remote location without requiring the use of tanker trucks, power operated pumps, or skilled personnel. All of this is accomplished by means of use of the present method and its associated resilient reservoir.

It will be appreciated that the reservoir of the present invention may be delivered to the site of liquid transfer by any of various means including truck and other land vehicles, helicopters and other air vehicles, including the possibility of parachuting the same to desired location and may be also transported by boat either on the boat or by towing a group of floating liquid containing reservoirs which have been suitably secured to each other or the boat.

It will be appreciated that when the two materials are to be kept apart prior to dispensing they may be provided in separate reservoirs of the invention or in a divided reservoir with a suitable mixing nozzle so as to maintain separation prior to use. An example of such use would be ingredients employed to create a fire retarding or extinguishing foam.

Whereas particular embodiments of the invention have been described above for purposes of illustration, it will be evident to those skilled in the art, that numerous variations of the details may be made without departing from the invention as defined in the appended claims.

I claim:

1. A method of dispensing a liquid by means of a vehicle comprising
    providing an elongated liquid containing resilient storage reservoir having an outlet opening,
    positioning said reservoir in a path of traction means of said vehicle, and
    moving said vehicle so as to cause said traction means to run over at least a portion of said reservoir in a longitudinal axial direction to progressively compress said reservoir and progressively urge said liquid out of said reservoir while resisting substantial lateral expansion of said reservoir in front of said traction means.

2. The dispensing method of claim 1 including providing said liquid as a fire extinguishing material.

3. The dispensing method of claim 1 including providing said resilient reservoir as a fuel storage reservoir,
    providing fuel as said liquid in said reservoir, and
    prior to urging said fuel out of said reservoir connecting said resilient storage reservoir with a fuel inlet of said vehicle.

4. The dispensing method of claim 3 including
    providing a filler tube connecting said reservoir to said vehicle, whereby fuel urged out of said reservoir will travel through said filler tube into said vehicle.

5. The method of refueling a vehicle of claim 3 including
    providing said reservoir with an elongated body having an enlarged portion and an adjacent tapered portion, and
    causing said traction means to engage said tapered portion before engaging said enlarged portion.

6. The method of refueling a vehicle of claim 5 including
providing said reservoir with said enlarged portion being substantially cylindrical and said tapered portion being substantially conical, and
placing at least a portion of said enlarged portion in contact with the ground.

7. The method of refueling a vehicle of claim 5 including
providing valve means operatively associated with said outlet means to alternately restrict or permit flow of fuel out of said reservoir.

8. The method of refueling a vehicle of claim 7 including
reservoir lifting means secured to the exterior of said reservoir, and
lifting said reservoir by said lifting means and placing said reservoir on the ground.

9. The method of refueling a vehicle of claim 5 including
providing said reservoir with a substantially flat lower surface, and
placing said lower surface in contact with the ground.

10. The method of refueling a vehicle of claim 9 including
providing said reservoir with an upper surface having at least a portion which is angularly downwardly oriented, and
placing said angularly downwardly portion at the end of said reservoir first contacted by said vehicle traction means.

11. The method of refueling a vehicle of claim 9 including
providing said vehicle as a military tank having traction means in the form of endless tread means, and
running one of said endless tread means over said storage reservoir.

12. The method of refueling a vehicle of claim 11 comprising
controlling the rate of speed of said vehicle so as to achieve a desired rate of flow of fuel into said vehicle.

13. A collapsible liquid storage and dispensing reservoir comprising
an elongated unitary resilient member composed of a resiliently compressible material, and
said reservoir having a body portion and an adjacent tapered portion, whereby vehicle traction means running over said reservoir in a longitudinal axial direction will compress said reservoir progressively to urge said liquid from said reservoir while resisting substantial lateral expansion of said reservoir in front of said traction means.

14. The collapsible liquid storage reservoir of claim 13 including
said elongated portion being generally cylindrical and said tapered portion being generally conical.

15. The collapsible liquid storage reservoir of claim 14 including
at least a portion of said reservoir having tread means to facilitate more efficient engagement by traction means of a vehicle.

16. The collapsible liquid storage reservoir of claim 15 including
said reservoir having a storage capacity of about 10 to 200 gallons.

17. The collapsible liquid storage reservoir of claim 15 including
reservoir engaging means secured to the exterior thereof.

18. The collapsible liquid storage reservoir of claim 17 including
said reservoir engaging means including an elongated member secured, at least in part in spaced relationship with respect to the exterior surface of said reservoir.

19. The collapsible liquid storage reservoir of claim 13 including
said body portion having a generally flat ground engaging lower surface, and
said tapered portion having a portion extending generally angularly downwardly.

20. The collapsible liquid storage reservoir of claim 19 including
said reservoir having an upper surface portion adjacent to said angularly downwardly extending portion and being substantially parallel to said lower surface.

21. The collapsible liquid storage reservoir of claim 13 including
said storage reservoir being elongated and having an outlet disposed adjacent one end thereof.

22. The collapsible liquid storage reservoir of claim 21 including
said angularly downwardly extending portion disposed at or adjacent the end opposite of said outlet end.

23. The collapsible liquid storage reservoir of claim 21 including
valve means operatively associated with said outlet.

24. The collapsible liquid storage reservoir of claim 21 including
outlet tube means secured to said reservoir outlet for directing the flow of said liquid urged out of said reservoir.

25. The collapsible liquid storage reservoir of claim 21 including
second valve means operatively associated with said reservoir for introduction of compressed air therein.

26. The collapsible liquid storage reservoir of claim 13 including
a plurality of inwardly open channels formed within the wall of said reservoir.

27. The collapsible liquid storage reservoir of claim 26 including
said channels being oriented generally longitudinally within said reservoir.

* * * * *